(12) United States Patent
Bohn (10) Patent No.: US 7,098,892 B2
(45) Date of Patent: *Aug. 29, 2006

(54) REMOTE SCROLL WHEEL SENSING USING A CABLE

(75) Inventor: David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 350 days.

This patent is subject to a terminal disclaimer.

(21) Appl. No.: 10/359,530

(22) Filed: Feb. 5, 2003

(65) Prior Publication Data

US 2004/0150622 A1 Aug. 5, 2004

(51) Int. Cl.
*G09G 5/08* (2006.01)
(52) U.S. Cl. .................... 345/163; 345/166
(58) Field of Classification Search ........ 345/156–167, 345/170; 250/221, 224, 231; D14/402–409
See application file for complete search history.

(56) References Cited

U.S. PATENT DOCUMENTS

| | | | |
|---|---|---|---|
| 5,168,268 A * | 12/1992 | Levy | 345/165 |
| 5,467,507 A * | 11/1995 | Marsh et al. | 24/298 |
| 5,530,455 A * | 6/1996 | Gillick et al. | 345/163 |
| 5,912,661 A | 6/1999 | Siddiqui | |
| 6,075,518 A | 6/2000 | Pruchniak | |
| 6,097,371 A | 8/2000 | Siddiqui et al. | |
| 6,281,881 B1 | 8/2001 | Siddiqui et al. | |
| 6,353,429 B1 | 3/2002 | Long | |
| 6,380,927 B1 | 4/2002 | Ostrum et al. | |
| 6,476,375 B1 * | 11/2002 | Nicoud et al. | 250/221 |
| 2005/0052079 A1 * | 3/2005 | Kamata et al. | 307/10.1 |

* cited by examiner

*Primary Examiner*—Richard Hjerpe
*Assistant Examiner*—Mansour M. Said
(74) *Attorney, Agent, or Firm*—Banner & Witcoff, Ltd.

(57) ABSTRACT

A scrolling apparatus is disclosed that includes a rotatable scroll wheel and a sensor assembly coupled mechanically through a flexible cable. The sensor assembly has an encoder wheel that rotates in response to rotation of the scroll wheel. The rotational axis of the encoder wheel is axially displaced from the rotational axis of scroll wheel, and the diameter of the encoder wheel may be greater than the diameter of a conventional encoder wheel. The differences in diameter of the scroll wheel and encoder wheel may be utilized to provide the scrolling apparatus with relatively high resolution. In addition, the flexible cable permits the scroll wheel to be mounted within a tilting mechanism.

19 Claims, 5 Drawing Sheets

REMOTE SCROLL WHEEL SENSING USING A CABLE

BACKGROUND OF THE INVENTION

1. Field of the Invention

The present invention relates to a scrolling apparatus for repositioning an image relative to a display screen. More particularly, the invention relates to a scrolling apparatus that utilizes a cable to connect a scroll wheel and an encoder wheel. The invention has application to input devices, such as a mouse, trackball, or keyboard, to scroll an image relative to a display screen.

2. Description of Background Art

The viewable contents of a computer file, such as a text document, spreadsheet, digital photograph, Web page, or other image rendered on a conventional display screen, may possess a size exceeding the viewable boundaries of the display screen. To address this issue, an individual may utilize a scrolling apparatus to reposition the image relative to the display screen, thereby permitting the individual to view portions of the computer file not currently rendered. As utilized herein, scrolling describes a translatory movement of the image relative to the display screen and in a particular direction. For example, scrolling down generally describes a movement of the image relative to the display screen so as to produce an effect of moving downward in the image. Similarly, scrolling up, scrolling left, and scrolling right generally describe movement of the image relative to the display screen so as to produce an effect of moving the image upward, left, and right, respectively.

Scrolling apparatuses have been incorporated into a plurality of peripheral input devices, including computer mice and trackball pointing devices, for example. An example of a computer mouse incorporating a scrolling apparatus is disclosed in U.S. Pat. No. 5,912,661 to Siddiqui, which is hereby incorporated by reference. Elements of the scrolling apparatus include a finger-engageable scroll wheel and a sensor assembly. The scroll wheel is mounted within a housing of the computer mouse, and a portion of the scroll wheel protrudes from an opening in the housing to permit an individual to selectively rotate the scroll wheel. The sensor assembly detects rotation of the scroll wheel and transmits a corresponding signal to a host computer, thereby directing the image to scroll relative to the display screen. By rotating the scroll wheel in a first direction, an image on a display screen may be scrolled upward, for example. Similarly, by rotating the scroll wheel in an opposite second direction, the image may be scrolled downward. Accordingly, a scroll wheel may be operated in a bi-directional manner to vertically scroll the image relative to the display screen.

The sensor assembly in U.S. Pat. No. 5,912,661 includes an encoder wheel, a light source, and a light sensor. The encoder wheel and the scroll wheel are spaced from each other and mounted in an axially-aligned manner on a shared rotatable axle that is positioned within the housing. In addition, the encoder wheel is positioned between the light source and the light sensor. A plurality of angularly-spaced openings extend around a periphery of the encoder wheel to form a circular sensing region. As the encoder wheel rotates, light from the light source is alternately (1) transmitted through the openings and (2) blocked by the material of the encoder wheel. As the encoder wheel rotates, the pulses of light transmitted through the openings are detected by the light sensor. In response to the pulses of light, the light sensor transmits a signal to a host computer that indicates rotation of the scroll wheel, thereby inducing scrolling of the image relative to the display screen. Furthermore, the frequency of the sensed pulses corresponds to the rate at which the scroll wheel is being rotated. Accordingly, the rate at which the scroll wheel rotates is generally correlated to the speed at which the image scrolls.

In another existing scrolling apparatus, the scroll wheel includes, in the form of a hub, a plurality of internal angular slit openings that form an encoder disk/wheel. The light source and the light sensor are positioned on opposite sides of the encoder wheel. When the scroll wheel is rotated, light pulses are alternatively (1) transmitted through the openings and are detected by the light sensor, and (2) blocked by material between the slits. Scrolling is then performed similar to the manner described above.

In each scrolling apparatus discussed above, the scroll wheel and the encoder wheel rotate at the same rate. That is, a single rotation of the scroll wheel causes a single rotation of the encoder wheel. The sensing capabilities of these embodiments therefore depend upon the number of openings or slits in the encoder wheel at its sensing radius location. For example, if there are 20 openings disposed on the encoder wheel (1 opening for every 18°), a single rotation of the scroll wheel will cause the encoder wheel to rotate a full 360° and there will be 20 pulses. To increase the resolution capabilities of the described systems, the encoder wheels would need to be provided with more openings or slits that are spaced closer together so that more pulses are provided per revolution. However, there is a practical limit in increasing the number of openings in an encoder wheel with a limited sensing diameter due to manufacturing capabilities, tolerances, and costs. Accordingly, a scroll wheel sensing arrangement with increasing resolution capabilities was thus needed.

SUMMARY OF THE INVENTION

In one aspect of the present invention, a scrolling apparatus having the capability of providing a relatively high resolution is incorporated into a housing of an input device. The scrolling apparatus includes a scroll wheel that is mechanically coupled to a sensor assembly, which may further include an encoder wheel, a light source, and a light sensor. The encoder wheel includes a plurality of openings and is rotatably-mounted between the light source and the light sensor such that a rotational axis of the encoder wheel is offset from a rotational axis of the scroll wheel. The mechanical coupling between the scroll wheel and the sensor assembly, particularly the encoder wheel, includes a flexible cable and operates to rotate the encoder wheel when an individual utilizing the input device rotates the scroll wheel. When the encoder wheel rotates, light from the light source passes through the openings to form pulses of light that enter the light sensor. A signal is then transmitted by the light sensor, or a microprocessor coupled to the light sensor, to a host computer that directs scrolling of an image relative to a display screen.

The cable that connects that forms the mechanical coupling between the scroll wheel and the sensor assembly may be secured to an axle extending from the scroll wheel and also secured to another axle that extends from the encoder wheel. Although the cable has flexible characteristics, the cable transfers torque to the encoder wheel that is generated by rotation of the scroll wheel, thereby inducing rotation in the encoder wheel. The cable may be secured to the axles through either crimping or molding processes, and the cable may be positioned within a hollow sheath.

In another aspect, the scrolling apparatus has a high degree of design flexibility to provide a desired resolution due in part to a configuration wherein the rotational axis of the encoder wheel is displaced from the rotational axis of the scroll wheel. In one embodiment, the scroll wheel is oriented vertically and perpendicular to a supporting surface, and positioned toward a front area of a mouse-style pointing device. The encoder wheel is also oriented vertically and perpendicular to the supporting surface, but is positioned towards a rear area of the pointing device. In this arrangement, the rotational axes of the scroll wheel and the encoder wheel may be substantially parallel. In another embodiment, the encoder wheel is oriented horizontally such that the rotational axes of the scroll wheel and the encoder wheel are substantially perpendicular.

According to another aspect, the structure of the scrolling apparatus provides a configuration that permits the encoder wheel to be in a different area of the input device than the scroll wheel. The encoder wheel of the present invention may be located in a rear area of the input device, which generally has more available space. Accordingly, a diameter of the encoder wheel, and if desired the sensing region of the encoder wheel, may be greater than a diameter of the scroll wheel. The increased diameter permits a greater number of openings to be formed in the encoder wheel, thereby increasing resolution of detectable movement in the scroll wheel. Furthermore, this configuration permits the scroll wheel to be mounted within a gimbal that permits the scroll wheel to be tilted in a side-to-side direction, which may be utilized for horizontal scrolling, for example.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose scrolling apparatuses for moving or scrolling an image relative to a display screen. Viewable portions of computer files, which include text documents, spreadsheets, digital photographs, computer-generated drawings, or Web pages, for example, may be rendered as an image on a display screen. The manner in which the image is configured to be rendered on the display screen determines whether all portions of the image are simultaneously rendered within viewable boundaries of the display screen. Accordingly, the image may be configured to possess dimensions fitting entirely within the viewable boundaries of the display screen. The same image, however, may also be configured to possess dimensions exceeding the viewable boundaries of the display screen. In other words, the image may include a rendered portion that is currently viewable on the display screen and a hidden portion that is not simultaneously viewable on the display screen. The scrolling apparatuses of the present invention are utilized to scroll the image relative to the display screen, thereby revealing the hidden portions of the image.

Figure 1:
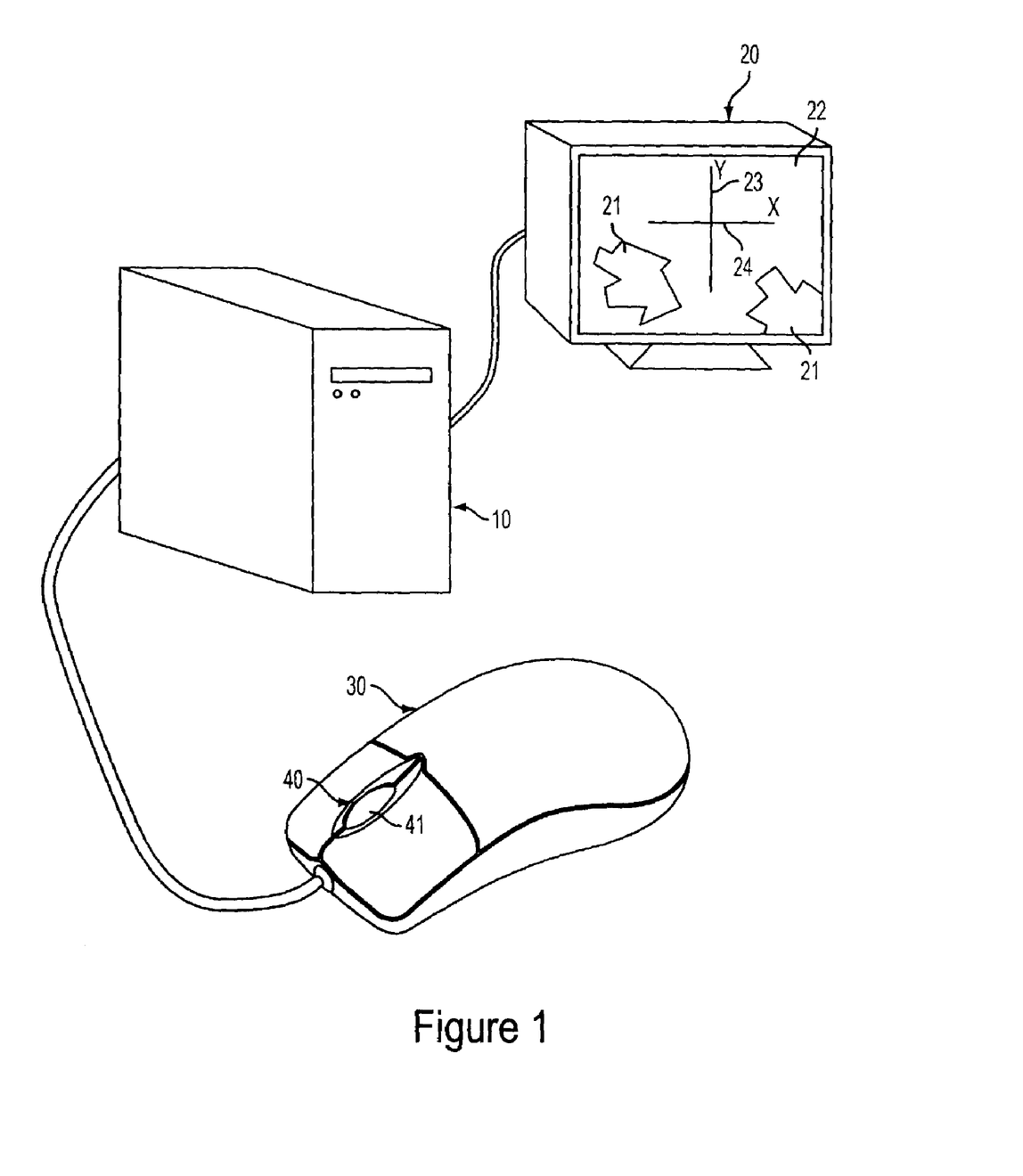
FIG. 1 is a perspective view of an input device incorporating a scrolling apparatus in accordance with the present invention, the input device being operatively connected to a host computer and a display device.

FIG. 1 depicts a host computer 10 operatively connected to a display device 20, such as a computer monitor, and an input device 30, which may be a computer mouse. One skilled in the relevant art will recognize that a computer file may be processed by the host computer 10 and a signal may be transmitted to the display device 20, thereby directing the display device 20 to render an image 21 on a display screen 22. The image 21 includes, in accordance with the discussion above, a rendered portion and a hidden portion. An individual viewing the image 21 will not, therefore, view all portions of the image 21 simultaneously. To address this issue, the input device 30 incorporates a scrolling apparatus 40 that may be utilized by the individual to scroll the image 21 relative to the display screen 22. For example, the image 21 may be scrolled in a vertical direction, which corresponds with a y-axis 23. In further embodiments, or if operated under different conditions, the image 21 may also be scrolled in a horizontal direction, which corresponds with an x-axis 24, or the image 21 may be scrolled diagonally. Both the y-axis 23 and the x-axis 24 are depicted for reference on the display screen 22. The individual may, therefore, utilize the scrolling apparatus 40 to scroll the image 21 relative to the display screen 22, thereby permitting the individual to view currently hidden portions of the image 21.

The scrolling apparatus 40 is depicted in the figures as being incorporated into the input device 30, which is a pointing device, particularly a computer mouse. In addition to the mouse-style pointing device, the scrolling apparatus 40 may also be incorporated into other types of input devices, including a trackball pointing device, a touchpad pointing device, and a keyboard, for example. Within the scope of the present invention, however, the scrolling apparatus 40 may also be incorporated into a plurality of other computer-related input devices, such as the bezel of a personal data assistant or handheld computing device, a web pad or other internet appliance, a gaming controller, or a chassis of a notebook computer, for example. The manner in which the scrolling apparatus 40 may be incorporated into a computer system is not limited, therefore, to the precise example embodied by the input device 30 in the drawings, but may be incorporated into a variety of components to provide the high resolution scrolling functions discussed herein.

Figure 2:
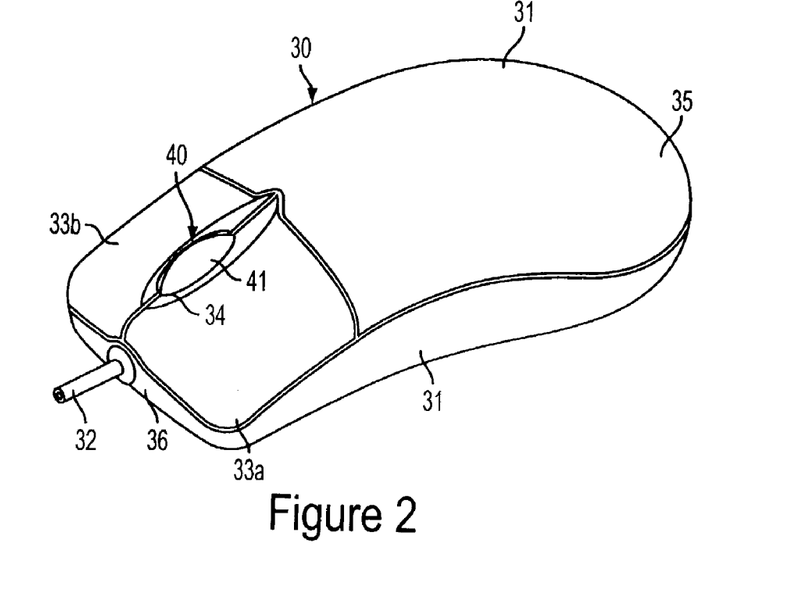
FIG. 2 is a perspective view of the input device incorporating the scrolling apparatus.

The input device 30 is depicted individually in FIG. 2 and serves multiple functions, including the functions of the scrolling apparatus 40. As represented, the input device 30 is a mouse-style pointing device having an outer housing 31 generally shaped to interface with the shape of a hand. A tracking assembly (not depicted) is partially enclosed within the housing 31 for detecting movement of the input device 30 relative to a support surface, as is known in the art. The tracking assembly includes a rollball that engages perpendicular rollers. The rollball protrudes outward from the housing 31 and rotates in multiple directions. A first roller senses movement of the mouse (via the movement of the rollball) in a first direction, while a second roller senses movement of the mouse (via the movement of the rollball) in a second direction. An optical tracking system may alternatively be employed, as is known in the art. Upon rotation of the rollball, a signal is transmitted to the host computer 10 through a cord 32, thereby directing the host computer 10 to move a cursor on the display screen 20. Alternately, the signal may be transmitted to the host computer 10 through a wireless connection, as is known in the art. The input device 30 also includes on its housing 31 a primary key 33a and a secondary key 33b for manipulating objects, such as hypertext links, buttons, or icons, on the display screen 22, as is known in the art. In general, the cursor may be positioned over an object through use of the tracking assembly, and one of keys 33a and 33b may be depressed, thereby manipulating the object by transmitting a corresponding signal to the host computer 10.

The housing 31 includes an aperture 34 therein for providing access to the scrolling apparatus 40. The aperture 34 is preferably positioned between keys 33a and 33b. The scrolling apparatus 40 includes a scroll wheel 41 that protrudes upwardly through the aperture 34 and has a generally circular or wheel-shaped structure for engagement by the user. The exterior surface of the scroll wheel 41 may be smooth or grooved. An axle 42 extends through a central portion of the scroll wheel 41 to define an axis of rotation for the scroll wheel 41. End portions of the axle 42 are rotatably-mounted on a pair of supports 43a and 43b, thereby permitting the scroll wheel 41 to revolve about the axle 42 in either a forward or backward direction. As utilized herein, the term "scroll wheel" denotes an endlessly rotatable (i.e., not limited to a number of rotations) structure configured to enable scrolling of an image on a display screen.

When operating the input device 30, the hand of the individual will generally rest upon an upper surface of the housing 31 such that the fingers extend over keys 33a and 33b and over the scrolling apparatus 40. The fingers may then be utilized to operate keys 33a and 33b and the scrolling apparatus 40. Within the scope of the present invention, however, the aperture 34, or any other aperture for providing access to the scrolling apparatus 40, may be located in other portions of the housing 31. As discussed above, the scrolling apparatus 40 may also be incorporated into other input devices. With regard to the keyboard, handheld computing device, or notebook computer, for example, an aperture for the scrolling apparatus 40 may be located at any position that provides the individual with convenient access for operating the scrolling apparatus 40.

Figure 3:
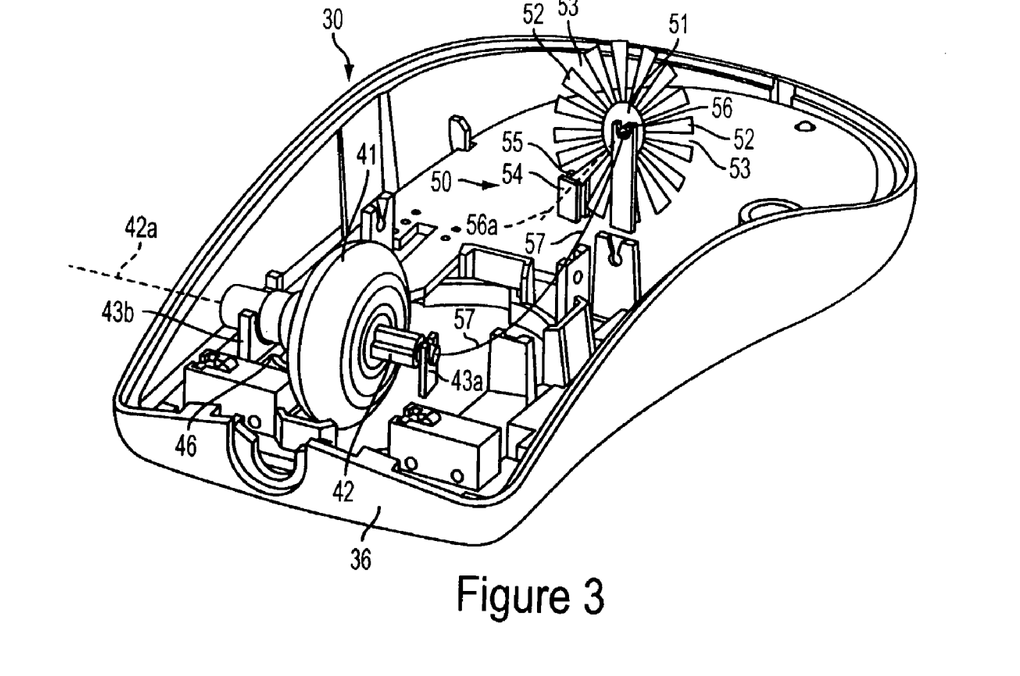
FIG. 3 is a cut-away perspective view of the input device depicting the scrolling apparatus.

The configuration and operation of the sensor assembly 50 will now be discussed. In general, the sensor assembly 50 includes an optical-based arrangement that detects rotational movement of the scroll wheel 41 and transmits a corresponding signal to the host computer 10, thereby causing the image 21 to scroll relative to the display screen 22. More specifically, a rotation of the scroll wheel 41 induces a corresponding substantial proportional rotation in an encoder wheel 51 positioned in a more rearward area 35 of the housing 31. The encoder wheel 51 includes a plurality of blades 52 and openings 53 extending radially outward from a central area of the encoder wheel 51. Openings 53 are generally located between blades 52 and in peripheral portions of the encoder wheel 51. A light source 54 and a light sensor 55, which may be a light emitting diode and a phototransistor, respectively, are positioned on opposite sides of the encoder wheel 51. As utilized herein, the term "encoder wheel" denotes a rotatable wheel or disk that assists with the detection of rotation, and may include a plurality of openings (or reflective surfaces) that permit the transmission of (or reflect) light or another detectable waveform.

As the encoder wheel 51 rotates, light from the light source 54 is alternately (1) transmitted through openings 53 and (2) blocked by the material of blades 52. Pulses of light are transmitted through openings 53 as the encoder wheel 51 rotates enter the light sensor 55. In response to the pulses of light, the light sensor 55, or a microprocessor operatively connected to the light sensor 55, transmits a signal to the host computer 10 that indicates data relating to the angular rotation of the scroll wheel 41, thereby inducing the image 21 to scroll relative to the display screen 22. Furthermore, the frequency of the pulses is associated with the rate at which the scroll wheel 41 is being rotated. This can be used to control the speed at which the image 21 scrolls.

The encoder wheel 51 is positioned in the rear area 35 of the housing 31 and mounted on a rotatable axle 56 that is separate from the axle 42. The axis of rotation 56a of encoder wheel 51 lies within the axle 56, and is in an embodiment of the invention, substantially parallel to an axis of rotation 42a of the scroll wheel 42. The axle 56 extends from the central area of the encoder wheel 51 and provides support for the encoder wheel 51. A first end of a flexible cable 57 is secured to an end of the axle 42, and a second end of the cable 57 is secured to an end of the axle 56. The cable 57 transfers torque to the encoder wheel 51 that is generated by rotation of the scroll wheel 41, thereby inducing rotation in the encoder wheel 51 when the scroll wheel 41 is rotated. This configuration mechanically couples the scroll wheel 41 and the encoder wheel 51. Accordingly, the encoder wheel 51 rotates in response to a rotation of the scroll wheel 41.

The cable 57 is be formed of a flexible material that will transmit torque from the scroll wheel 41 to the encoder wheel 51. In general, cable 57 may be any flexible structure with a high aspect ratio of length to width that may be utilized to mechanically couple the encoder wheel 51 and the scroll wheel 41, including a single strand or multiple strands of a polymer or metal material. Accordingly, suitable materials for the cable 57 include polymers such as rubber, urethane, or nylon, or steel. In addition to the strands of polymer or metal materials, the cable 57 may be a chain that extends between the scroll wheel 41 to the encoder wheel 51.

Figure 4:
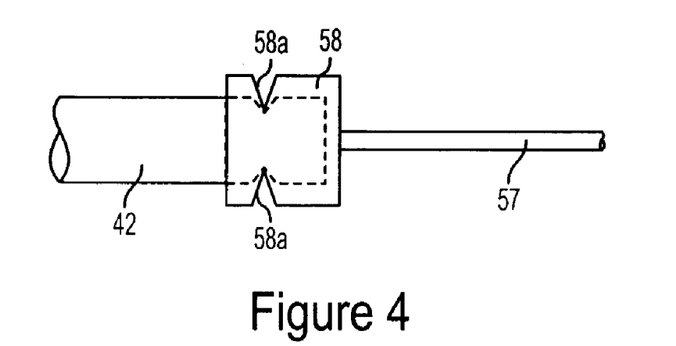
FIG. 4 is a schematic view of a crimped connection between a cable and an axle.
Figure 5:
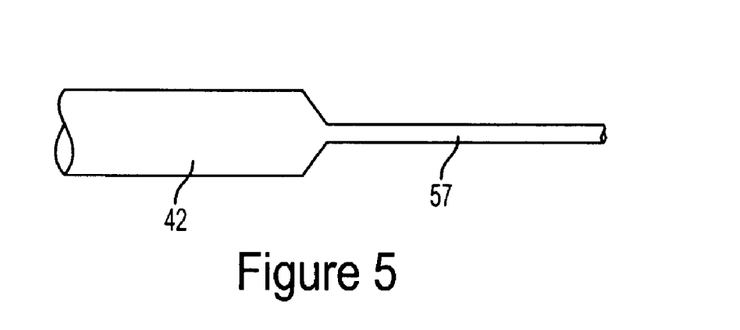
FIG. 5 is a schematic view of a molded connection between a cable and an axle.

The specific configuration of the mechanical coupling between the scroll wheel 41 and the encoder wheel 51, which includes the scroll wheel axle 42, the cable 57, and the encoder wheel axle 56 may vary significantly within the scope of the present invention. For example, the cable 57 may be secured to the axle 42 or the axle 56 through a crimped connection. Referring to FIG. 4, the cable 57 is depicted as having an enlarged mounting element 58 positioned over the end of the axle 42. In connecting the cable 57 to the axle 42, at least one crimp 58a is formed in the mounting element 58. Accordingly, the material forming the mounting element 58 protrudes into the material forming the axle 42 and provides a secure connection between the cable 57 and the axle 42. A similar configuration may be utilized to secure the cable 57 to the axle 56. As an alternative to the crimped configuration depicted in FIG. 4, the cable 57 may be integrally molded with the axle 42 and the axle 56. With reference to FIG. 5, the cable 57 is depicted as being molded to the axle 42. A similar configuration may join the cable 57 with the axle 56 such that the axle 42, the cable 57, and the axle 56 form a unitary component of the scrolling apparatus 40.

Figure 6:
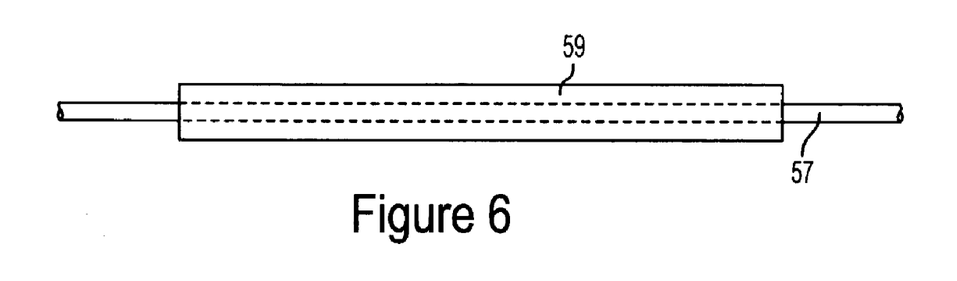
FIG. 6 is a schematic view of a cable located within a sheath.

Portions of the cable 57 extending between the axle 42 and the axle 56 may be exposed within the housing 31 of the input device 30, as depicted in FIG. 3. As an alternative, however, the cable 57 may be positioned within a sheath 59, as depicted in FIG. 6. The sheath 59 is a hollow structure that surrounds the cable 57 and protects the cable 57. In addition, the sheath 59 may provide a low friction surface that assists in the transfer of torque from the scroll wheel 41 to the encoder wheel 51.

The encoder wheel 51 is mounted on the axle 56, which is separate from the axle 42, and the cable 57 provides the mechanical coupling. Thus, this configuration of the scrolling apparatus 40 offsets the rotational axis 56a of the encoder wheel 51 from the rotational axis 42a of the scroll wheel 41. Accordingly, the rotational axis 56a of the encoder wheel 51 is axially displaced from the rotational axis 42a of the scroll wheel 41. As depicted in FIG. 4, the rotational axis 56a is set at approximately 90° from the rotational axis 42a. In further embodiments of the present invention, the rotational axis 56a may be set in a range of 45° to 135° with respect to the rotational axis 42a. Furthermore, the rotational axis 56a may be parallel to the rotational axis 42a. Accordingly, the use of the cable 57 to mechanically couple the scroll wheel 41 and the encoder wheel 51 permits the encoder wheel to be placed in a wide variety of orientations with respect to the scroll wheel 41.

Since the encoder wheel 51 no longer needs to be on the same axis 42 as the scroll wheel 41, the encoder wheel 51 can be moved to a different location and/or rotation inside the mouse 30 such as an area that would permit its size to be increased. For example, the general configuration of the housing 31, as depicted in FIG. 2, is representative of a housing-type utilized in a conventional computer mouse. Specifically, the central portion of the rear area 35 of the housing 31 bulges upward to support the hand of a user, and the housing 31 slopes downward toward the front area 36 to assist in providing an ergonomic shape. Whereas the distance between upper and lower portions of the housing 31 is relatively large in the central portion of the rear area 35, the distance is substantially smaller in the front area 36. The downward slope has an effect, therefore, upon the available volume within the front area 36 of the housing 31 for storing electrical components and other elements of the computer mouse. Despite the decreased volume, a substantial portion of the electrical components and other elements, such as the scroll wheel 41, the axle 42, supports 43a and 43b, are located in the front area 36. In addition, the encoder wheel is also located in the front area of the conventional computer mouse. Through a mechanical coupling to move the encoder wheel 51 off axis, such as the coupling formed by the cable 57, a larger, more economical sensor device may be positioned in rear area 35, behind the scrolling wheel 41, where the distance between upper and lower portions of the housing 31 is relatively large in comparison with the front area 36. Accordingly, the diameter of the encoder wheel 51 may be greater than the diameter of the conventional encoder wheel. An additional benefit of this an arrangement may be the reduction of the probability of an electrostatic discharge as the electrical optics elements are moved farther away from the aperture through which the scroll wheel 41 protrudes.

A result of moving the encoder wheel 51 to the rear area 36 is that the resolution of sensor assembly 50 may be increased through an increase in the diameter of the encoder wheel 51. By increasing the diameter of the encoder wheel 51, the size of the circumference is increased proportionally. This configuration permits a greater number of openings 53 to be formed in the encoder wheel 51. In other words, the number of pulses detected by a single rotation of the scroll wheel 41 would be greater than the number of pulses detected by a single rotation of the scroll wheel when using the conventional practical limits on encoder size and material and slit spacing. As a consequence of increasing the number of pulses, and therefore increasing the resolution, smaller angular displacements of the scroll wheel 41 can be detected.

Figure 8:
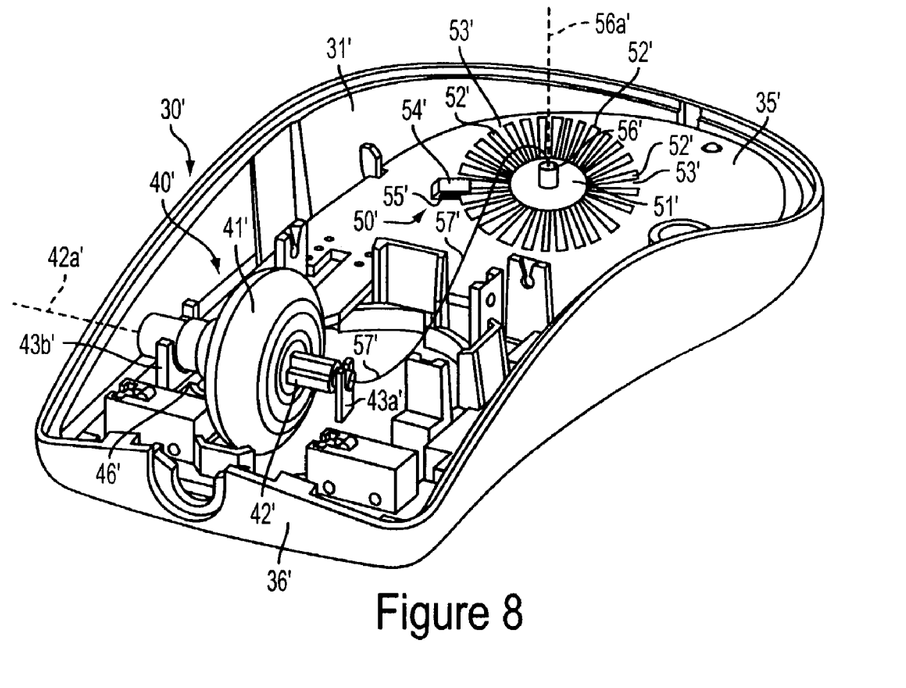
FIG. 8 is a cut-away perspective view of the input device depicting another configuration of a scrolling apparatus.

Another example of the manner in which the scrolling apparatus 40 may be altered within the scope of the present invention is depicted in FIG. 8 with reference to an input device 30', which has the general structure of the input device 30. Accordingly, the input device 30' has a housing 31' that encloses a scrolling assembly 40'. The components of the scrolling assembly 40' include a scroll wheel 41', an axle 42', supports 43a' and 43b', and a sensor assembly 50'. In operation, as with the embodiment of FIG. 3, the scroll wheel 41' protrudes through the housing 31' and rotates on the axle 42', which is supported by supports 43a' and 43b'. The sensor assembly 40' is also mechanically coupled to the scroll wheel 41' through a cable 57'. Accordingly, the scrolling apparatus 40' has a configuration that is similar to the scrolling apparatus 40.

One distinction between the scrolling apparatus 40' and the scrolling apparatus 40 relates to the structure of the sensor assembly 50', which includes an encoder wheel 51' with a plurality of blades 52' that define a plurality of openings 53'. Whereas the encoder wheel 51 is positioned substantially vertically, and substantially perpendicular to a supporting surface upon which the device 30 would sit in normal use, the encoder wheel 51' is positioned substantially horizontally and substantially parallel to a supporting surface upon which the device 30' would sit in normal use. Thus, based on the design of the housing of the input device 30', a rear area 35' of the housing 31' behind the scroll wheel 41' has an internal width such that the encoder wheel 51' may be larger than both the encoder wheel 51 and the encoder wheel of the conventional scrolling apparatus.

In addition to the encoder wheel 51', the sensor assembly 50' includes a light source 54' and a light sensor 55' positioned on opposite sides of the blades 52', and a rotatable axle 56' extending vertically out of a central area of the encoder wheel 51'. In operation, the light source 54' and the light sensor 55' detect movement of the encoder wheel 51', and the axle 56' provides an axis of rotation 56a'. In a manner that is similar to the sensor assembly 50, the cable 57' provide a mechanical coupling for the scroll wheel 41' and the encoder wheel 51'.

This configuration of the scrolling apparatus 40' offsets the rotational axis 56a' of the encoder wheel 51' from the rotational axis 42a' of the scroll wheel 41'. Whereas the rotational axes of the encoder wheel 51 and the scroll wheel 41 were also offset and parallel, the rotational axes of the encoder wheel 51' and the scroll wheel 41' are offset and oriented perpendicular to each other. The scrolling apparatus 40' also provides the same notable features as the scrolling apparatus 40. Specifically, the diameter of the encoder wheel 51' and the diameter of the sensing region of the encoder wheel 51' is greater than the diameter of the conventional encoder wheel and that of the scroll wheel 41', and such may be achieved due to the horizontal orientation. Accordingly, the resolution of detectable movement in the scroll wheel 41' may be increased.

Since the encoder wheel 51 is coupled to the scroll wheel 41 by a flexible cable connection, it provides the ability to mount the scroll wheel 41 in multiple arrangements that permit the scroll wheel 41 to serve additional actuator functions. For example, the scroll wheel may be mounted to permit side-to-side tilting and/or vertical displacement, and actuator of the scroll wheel 41 in those directions will not adversely impact the functioning of the encoder wheel 51 due to the flexible coupling system.

Figure 7:
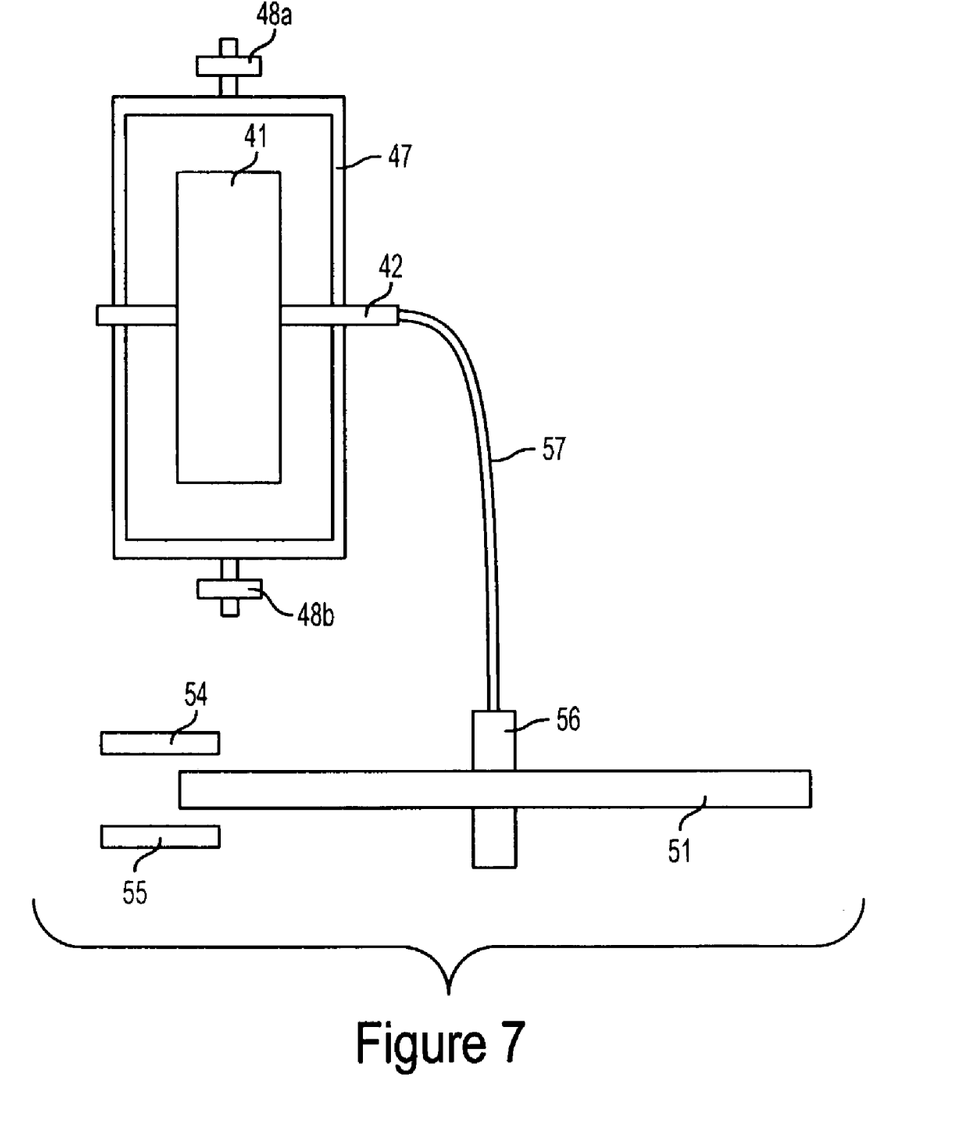
FIG. 7 is a schematic top plan view of the input device depicting another configuration of a scrolling apparatus.

For example, with reference to FIG. 7, the scroll wheel 41 is depicted as being positioned within a gimbal 47 that is rotatably mounted on a pair of supports 48a and 48b. The axle 42 extends outward from the scroll wheel 41 and is secured to the gimbal such that the scroll wheel 41 may rotate freely and endlessly. The supports 48a and 48b permit gimbal 47 to pivot in a side-to-side direction. A potentiometer-type sensor or a pair of switches (not depicted) may be associated with the gimbal 47 to detect the side-to-side rotation, which may be utilized to induce scrolling in the direction of the x-axis 24 in the display device 20.

In addition to or in lieu of the tilting arrangement, a Z-switch 46 or 46' may also be mounted adjacent to the axle 42 or 42' to sense downward pressure applied to the scroll wheel 41 or 41'. The axle 42 or 42' is configured to move a relatively small amount in a direction perpendicular to the axis of rotation, and the switch 46 or 46' closes in response to the perpendicular movement. Accordingly, the scroll wheel 41 or 41' also functions as a button. When the switch 46 or 46' is activated, a corresponding signal is transmitted to the host computer 10, thereby indicating that the individual is depressing the scroll wheel 41 or 41' generally toward the interior of the housing 31 or 31'. Thus, the movement of the scroll wheel 41 in a non-rotational manner is permitted without an adverse impact on the encoder wheel 51.

If desired, a detent mechanism may also be incorporated into the scrolling apparatus of any of the previously disclosed embodiments to prevent the scroll wheel from rotating unintentionally and to provide a segmented feel to the rotation of the scroll wheel.

While not shown, in lieu of the optical sensing system illustrated, the encoder wheel may have a side surface equipped with angularly spaced reflective elements. The light source and optical sensor can be placed on the same side of the encoder wheel. The light would then alternately be reflected off the reflective elements and absorbed in the regions therebetween. The reflected light is sensed by the light detector to create the sensed pulses. The pulses can be used to control the scrolling of an image as described above.

The specific configurations of the scrolling apparatus described and illustrated herein is intended to provide an example of the many configurations intended to fall within the scope of the present invention. Accordingly, the configuration of the scrolling apparatus may depart from the specific configuration disclosed above. For example, a sensor with a structure that is different from the optical encoders as disclosed may be utilized. Furthermore, the belt may be formed of a metallic or textile material, rather than the polymeric materials disclosed above.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An input device for scrolling an image relative to a display screen, the input device comprising:
   a scroll wheel;
   a flexible cable; and
   an encoder wheel mechanically coupled to the scroll wheel by the flexible cable to induce rotation of the encoder wheel in response to the rotation of the scroll wheel, wherein the scroll wheel is mounted on a first axle and the encoder wheel is mounted on a second axle, a rotational axis of the first axle being offset in a range of 45° to 135° from a rotational axis of the second axle.

2. The input device recited in claim 1, wherein the flexible cable includes a first end portion positioned adjacent the scroll wheel and a second end portion positioned adjacent the encoder wheel, the first end portion being angularly-displaced in a range of 45° to 135° relative to the second end portion.

3. The input device recited in claim 1, wherein an end of the flexible cable is integrally molded to at least one of the first axle and the second axle.

4. The input device recited in claim 1, wherein an end of the flexible cable is physically crimped to at least one of the first axle and the second axle.

5. The input device recited in claim 1, further comprising a hollow flexible sheath, and wherein the flexible cable is positioned within the flexible sheath.

6. The input device recited in claim 1, wherein the scroll wheel has a first diameter and the encoder wheel has a second diameter, the first diameter being less than the second diameter.

7. The input device recited in claim 1, wherein a material forming the flexible cable is selected from a group consisting of metal materials and polymer materials.

8. The input device recited in claim 7, wherein the cable consists of a single strand of the material.

9. The input device recited in claim 1, further comprising a housing configured to rest the computer input device on a supporting surface, wherein the scroll wheel and the encoder wheel are oriented perpendicular relative to the supporting surface.

10. The input device recited in claim 1, further comprising a housing configured to rest the computer input device on a supporting surface, wherein the scroll wheel is oriented perpendicular relative to the supporting surface and the encoder wheel is oriented parallel to the supporting surface.

11. The input device recited in claim 1, further including a light source and a light sensor positioned on opposite sides of the encoder wheel.

12. The input device recited in claim 11, wherein a plurality of openings are defined in the encoder wheel, and light from the light source passes through the openings and toward the light detector when the encoder wheel rotates.

13. The input device recited in claim 1, further comprising a housing having an aperture, wherein the scroll wheel protrudes through the aperture.

14. The input device recited in claim 13, wherein the scroll wheel is mounted to permit displacement thereof to activate a switch located within the housing.

15. The input device recited in claim 13, wherein the scroll wheel is mounted to tilt with respect to the housing.

16. The input device recited in claim 1, wherein the input device is one of a mouse, a trackball, and a keyboard.

17. The input device recited in claim 16, further comprising a housing having an aperture, and a light source and a light sensor positioned on opposite sides of the encoder wheel; wherein the scroll wheel protrudes through the aperture; and wherein the scroll wheel is mounted on a first axle and the encoder wheel is mounted on a second axle such that a rotational axis of the first axle being offset from a rotational axis of the second axle.

18. An input device comprising:

a housing having at least one aperture therein;

a scroll wheel having a substantially circular configuration such that a portion of the scroll wheel extends through the aperture and is accessible for rotational manipulation by a user;

a flexible cable having a first end portion and an opposing second end portion, the first end portion being angularly-displaced in a range of 45° to 135° relative to the second end portion; and an encoder wheel, wherein the first end portion of the flexible cable is mechanically coupled to the scroll wheel and the second end portion of the cable is mechanically coupled to the encoder wheel and the flexible cable being configured to rotate the encoder wheel in response to rotation of the scroll wheel.

19. An input device comprising:

a housing having at least one aperture therein, a scroll wheel having a substantially circular configuration such that a portion of the scroll wheel extends through the aperture and is accessible for endless rotational manipulation by a user;

a flexible cable having a first end portion and an opposing second end portion, the first end portion being angularly-displaced in a range of 45° to 135° relative to the second end portion; and an encoder wheel, wherein the first end portion of the flexible cable is mechanically coupled to the scroll wheel and the second end portion of the cable is mechanically coupled to the encoder wheel and the flexible cable being configured to rotate the encoder wheel by transferring torsional force induced by rotation of the scroll wheel to the encoder wheel; and a light source and a light sensor positioned on opposite sides of the encoder wheel configured to detect rotation of the encoder wheel;

wherein the input device is one of a mouse, a trackball, and a keyboard.

* * * * *